(12) United States Patent
Jensen

(10) Patent No.: US 9,784,240 B2
(45) Date of Patent: *Oct. 10, 2017

(54) REINFORCED WIND TURBINE BLADE

(71) Applicant: Find Mølholt Jensen, Viby Sjælland (DK)

(72) Inventor: Find Mølholt Jensen, Viby Sjælland (DK)

(73) Assignee: BLADENA SOLUTIONS APS, Ringsted (DK)

( * ) Notice: Subject to any disclaimer, the term of this patent is extended or adjusted under 35 U.S.C. 154(b) by 554 days.

This patent is subject to a terminal disclaimer.

(21) Appl. No.: 14/452,996

(22) Filed: Aug. 6, 2014

(65) Prior Publication Data

US 2014/0348651 A1    Nov. 27, 2014

Related U.S. Application Data

(63) Continuation of application No. 13/000,151, filed as application No. PCT/DK2009/000149 on Jun. 23, 2009, now Pat. No. 8,807,953.

(30) Foreign Application Priority Data

Jun. 24, 2008    (DE) .......................... PA 2008 00867

(51) Int. Cl.
   *F03D 1/06*    (2006.01)
   *F03D 3/06*    (2006.01)

(52) U.S. Cl.
   CPC ........... *F03D 1/0675* (2013.01); *F03D 3/062* (2013.01); *F05B 2210/16* (2013.01);
   (Continued)

(58) Field of Classification Search
   CPC .... F03D 1/0675; F03D 3/062; F05B 2210/16; F05B 2280/6003; F05B 2240/301; F05C 2253/04
   See application file for complete search history.

(56) References Cited

U.S. PATENT DOCUMENTS 1,555,409 A    9/1925    Gilmore
1,846,367 A    2/1932    Sikorsky
(Continued)

FOREIGN PATENT DOCUMENTS

CA    1151072    7/1981
CN    101029629 A    9/2007
(Continued)

OTHER PUBLICATIONS

Jensen, et al.; Full Scale Test of a SSP 34m box girder 1.Data Report; Risø National Laboratory for Sustainable Energy; Mar. 2008; pp. 1-77; Risø-R-1622 (EN); Technical University of Denmark; Roskilde, Denmark.

(Continued)

*Primary Examiner* — Gregory Anderson
*Assistant Examiner* — Eldon Brockman
(74) *Attorney, Agent, or Firm* — Lee & Morse, P.C.

(57) ABSTRACT

The present invention relates to a reinforced blade for a wind turbine, particularly to a blade having at least one elongated reinforcing member connected inside the shell for increasing the strength of the blade, each of the at least one elongated reinforcing member having a first end and a second end and extending in a longitudinal direction between the first end and the second end and wherein the first end is connected to the upper part of the shell and the second end is connected to the lower part of the shell thereby decreasing peeling and shear stresses in the trailing edge of the blade.

23 Claims, 11 Drawing Sheets

Figure 1:
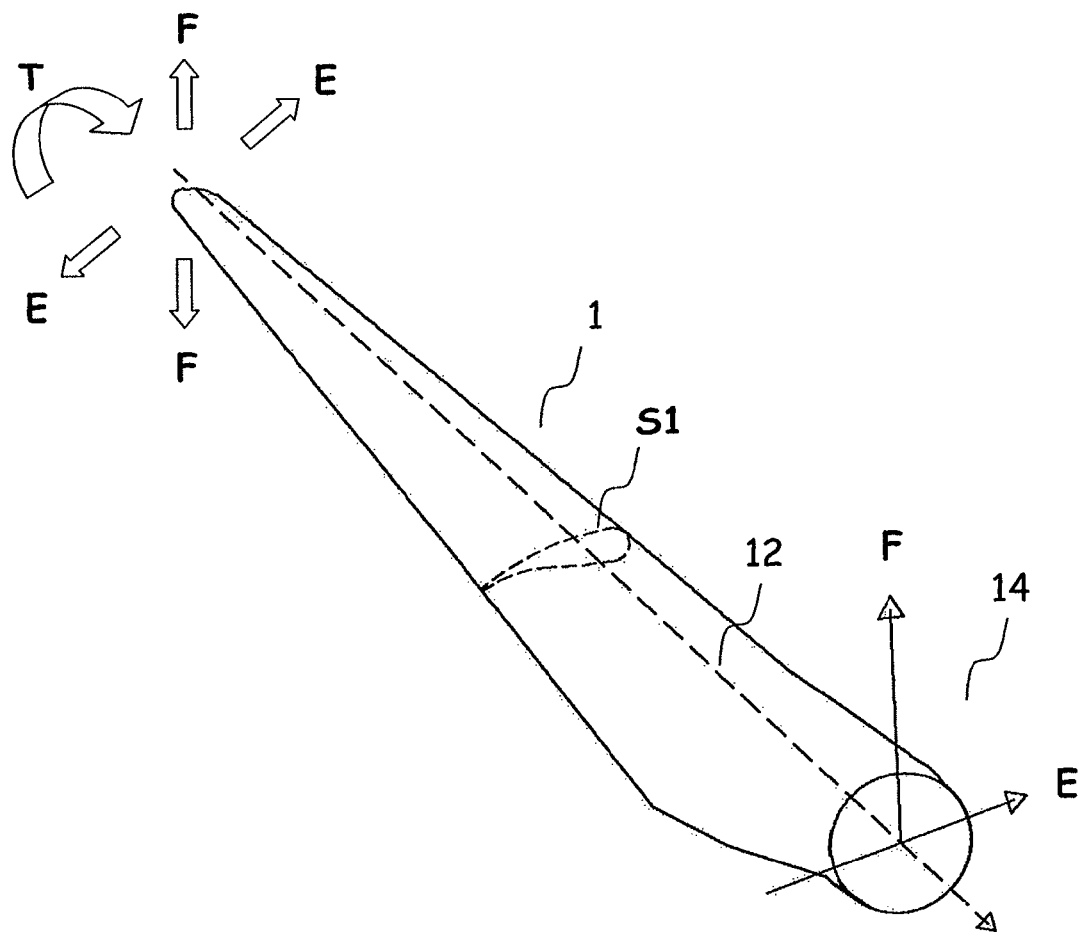

(52) U.S. Cl.
CPC . *F05B 2240/301* (2013.01); *F05B 2280/6003* (2013.01); *F05C 2253/04* (2013.01); *Y02E 10/721* (2013.01); *Y02E 10/74* (2013.01)

(56) References Cited

U.S. PATENT DOCUMENTS

| | | | |
|---|---|---|---|
| 4,295,790 A | 10/1981 | Eggert, Jr. | |
| 4,305,699 A | 12/1981 | Martinelli | |
| 4,494,910 A | 1/1985 | Hahn et al. | |
| 4,643,646 A | 2/1987 | Hahn et al. | |
| 4,976,587 A | 12/1990 | Johnston et al. | |
| 5,375,324 A | 12/1994 | Wallace et al. | |
| 5,401,138 A | 3/1995 | Mosiewicz | |
| 5,534,354 A | 7/1996 | Gregg et al. | |
| 6,457,943 B1 | 10/2002 | Olsen et al. | |
| 7,179,059 B2 | 2/2007 | Sorensen et al. | |
| 7,198,471 B2 | 4/2007 | Gunneskov et al. | |
| 7,503,752 B2 * | 3/2009 | Gunneskov | F03D 1/065 416/229 R |
| 7,517,198 B2 | 4/2009 | Baker et al. | |
| 7,600,978 B2 | 10/2009 | Vance et al. | |
| 7,901,188 B2 | 3/2011 | Llorente Gonzalez et al. | |
| 2003/0116262 A1 | 6/2003 | Stiesdal et al. | |
| 2006/0175731 A1 | 8/2006 | Bech et al. | |
| 2007/0040294 A1 | 2/2007 | Arelt | |
| 2007/0110584 A1 | 5/2007 | Stommel | |
| 2007/0110585 A1 | 5/2007 | Bonnet | |
| 2007/0140861 A1 | 6/2007 | Wobben | |
| 2007/0183888 A1 * | 8/2007 | Gunneskov | F03D 1/065 415/146 |
| 2007/0189903 A1 | 8/2007 | Eyb | |
| 2007/0217918 A1 | 9/2007 | Baker et al. | |
| 2008/0069699 A1 | 3/2008 | Bech | |
| 2008/0304971 A1 | 12/2008 | Liebmann | |
| 2008/0310964 A1 | 12/2008 | Llorente Gonzalez et al. | |
| 2009/0208341 A1 | 8/2009 | Llorente Gonzalez et al. | |
| 2009/0324412 A1 | 12/2009 | Roorda | |
| 2010/0062238 A1 | 3/2010 | Doyle et al. | |
| 2010/0092300 A1 | 4/2010 | Jensen et al. | |

FOREIGN PATENT DOCUMENTS

| | | |
|---|---|---|
| DE | 2923463 A1 | 12/1980 |
| DE | 3037677 A1 | 5/1982 |
| DE | 4225599 A1 | 2/1994 |
| DE | 4428730 A1 | 2/1996 |
| DE | 20320714 U1 | 2/2005 |
| EP | 0061567 A2 | 2/1982 |
| EP | 0062737 A1 | 2/1982 |
| EP | 0258926 A1 | 3/1988 |
| EP | 0391702 A1 | 10/1990 |
| EP | 1184566 A1 | 3/2002 |
| EP | 1310351 A1 | 5/2003 |
| EP | 1522724 A1 | 4/2005 |
| EP | 1584817 A1 | 10/2005 |
| EP | 1754589 A1 | 2/2007 |
| EP | 1785621 A2 | 5/2007 |
| EP | 1808598 A1 | 7/2007 |
| EP | 1878915 A2 | 1/2008 |
| EP | 1880833 A1 | 1/2008 |
| FR | 568874 A | 4/1924 |
| FR | 701140 A | 3/1931 |
| FR | 703261 A | 4/1931 |
| FR | 2286953 A1 | 4/1976 |
| FR | 2459381 A1 | 1/1981 |
| FR | 2898865 A1 | 9/2007 |
| GB | 319299 | 9/1929 |
| GB | 909004 | 10/1962 |
| GB | 2042093 A | 9/1980 |
| GB | 2062120 A | 5/1981 |
| GB | 2115075 A | 9/1983 |
| JP | 61-192866 A | 8/1986 |
| JP | 62-282176 A | 12/1987 |
| JP | 2003-214322 A | 7/2003 |
| JP | 2003-293937 A | 10/2003 |
| NL | 9100816 A | 12/1992 |
| WO | WO 00/14405 | 3/2000 |
| WO | WO 01/46582 A2 | 6/2001 |
| WO | WO 01/46582 A3 | 6/2001 |
| WO | WO 01/98653 A1 | 12/2001 |
| WO | WO 03/008800 A1 | 1/2003 |
| WO | WO 03/087572 A1 | 10/2003 |
| WO | WO 2004/078442 A1 | 9/2004 |
| WO | WO 2005/011964 A1 | 2/2005 |
| WO | WO 2006/002621 A1 | 1/2006 |
| WO | WO 2006/066593 A1 | 6/2006 |
| WO | WO 2006/103307 A2 | 10/2006 |
| WO | WO 2008/086805 A1 | 7/2008 |
| WO | WO 2008/089765 A2 | 7/2008 |
| WO | WO 2008/089765 A3 | 7/2008 |

OTHER PUBLICATIONS

Jensen, et al.; Full Scale Test of a SSP 34m box girder 1.Data Report; Appendix E; Riso National Laboratory for Sustainable Energy; Mar. 2008; pp. 78-150; Riso-R-1622 (EN); Technical University of Denmark; Roskilde, Denmark.

Jensen, et al.; Full Scale Test of a SSP 34m box girder 2. Data Report; Riso National Laboratory for Sustainable Energy; May 2008; pp. 1-159; Riso-R-1588 (EN); Technical University of Denmark; Roskilde, Denmark.

Jensen; Ultimate strength of a large wind turbine blade; Riso National Laboratory for Sustainable Energy; May 2008; pp. 1-313; Riso-PhD-34(EN); ISBN 978-87-550-3634-5, DTU BYG R-205-ISBN=9788778772831; Technical University of Denmark; Roskilde & Kgs. Lyngby, Denmark.

Nielsen; Experimental and numerical analysis of a wind turbine blade cross section under lateral load conditions; pp. 1-44; Dec. 20, 2006.

Jensen, et al.; Structural testing and numerical simulation of a 34 m composite wind turbine blade; Composite Structures; Jul. 2006; pp. 52-61; vol. 76; Elsevier.

Technical Survey Report 162778; PRV InterPat; dated Dec. 27, 2007; pp. 1-3; Stockholm, Sweden.

Technical Survey Report; 162779; PRV InterPat; dated Dec. 27, 2007; pp. 1-4; Stockholm, Sweden.

Technical Survey Report; 162780; PRV InterPat; dated Dec. 27, 2007; pp. 1-4 Stockholm, Sweden.

PCT International Search Report in DK 2008/00861, dated Feb. 20, 2009 (Jensen).

PCT International Search Report in DK 2008/00867, dated Feb. 24, 2009 (Jensen).

PCT International Search Report in 2008/0921, dated Mar. 24, 2009 (Jensen).

Notification of Transmittal of International Search Report, International Search Report and Written Opinion of the International Searching Authority in PCT/DK2009/000150 dated Sep. 9, 2009 (Jensen).

Chinese Office action dated Jan. 7, 2013 for related application CN 200980124196.2.

* cited by examiner

REINFORCED WIND TURBINE BLADE

CROSS REFERENCE TO RELATED APPLICATIONS

This is a continuation application based on pending application Ser. No. 13/000,151 filed Dec. 20, 2010, which in turn was a U.S. national phase application based on PCT Application No. PCT/DK2009/000149, filed Jun. 23, 2009, which is based on Danish Application No. PA 2008 00867, filed Jun. 24, 2008, the entire contents of all of which are hereby incorporated by reference.

The present invention relates to a reinforced blade for a wind turbine, particularly to a blade having elongated reinforcing members in the blade in order to prevent deformation of the trailing part of the shell.

Typically, a wind turbine blade has an aerodynamic shell and a girder, such as a beam or a spar. The girder can be a single beam, but often two girders are used. The two girders together with the parts of the shell extending between the two girders form a so-called box profile. The top and bottom of the box profile are often referred to as the caps. Some types of blades are designed with a spar in the form of a box profile which is manufactured separately and bonded in between prefabricated surface shells. The aerodynamic shell is typically made of a laminate of fibre reinforced plastics, fibreglass and/or other materials. Typically, the aerodynamic shell is made from two shell parts that are assembled to form the shell.

Under normal operating conditions, the wind turbine blade is subjected to loads at an angle to the flapwise direction. It is common to resolve this load on the blade into its components in the flapwise and edgewise direction. The flapwise direction is a direction substantially perpendicular to a transverse axis through a cross-section of the blade. The flapwise direction may thus be construed as the direction, or the opposite/reverse direction, in which the aerodynamic lift acts on the blade. The edgewise loads occur in a direction perpendicular to the flapwise direction. The blade is further subject to torsional loads which are mainly aerodynamic and inertia loads. These loads can subject the blade to harmonic motions or oscillations at the blade's torsional eigenfrequency; cf. FIG. 1 for an indication of the loads and the directions.

Figure 10:
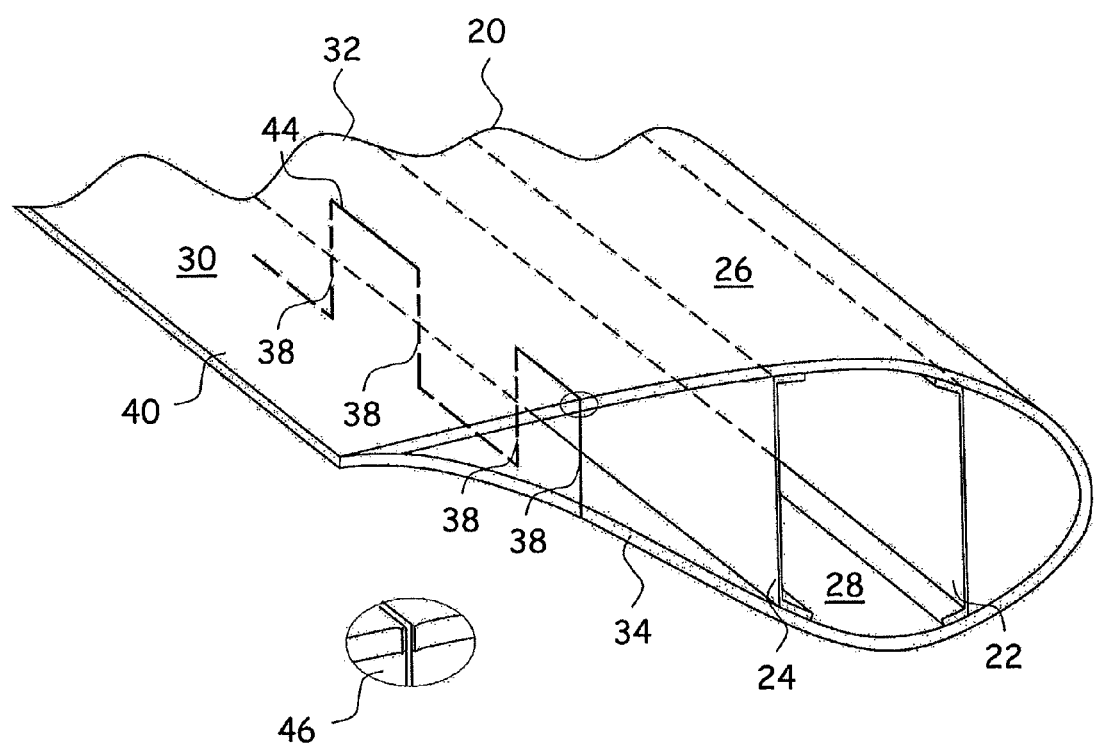

When a blade is subjected to edgewise loading the section of the shell between a trailing edge of the blade and the internal girder is deforming out of the plane of the "neutral" (or initial) plane of the surface, see FIG. 10. This deformation induces peeling stresses in the trailing edge of the blade and consequently this can lead to a fatigue failure in the adhesive joint of the trailing edge where the two shell parts are connected to each other. Furthermore, the deformation of the of the shell can lead to deformations in both the shell and the girder at the connection between the girder and the shell and this can lead to fatigue failure of the girder and/or fatigue failure of the shell and/or fatigue failure in the connection between the girder and the shell.

The fatigue failure in the trailing edge, the shell, girder or the connections may then ultimately cause the blade to break apart.

The deformation can also lead to buckling of the shell and this reduces the ultimate strength of the blade because the shell is load bearing. Furthermore, the deformations also compromise the aerodynamic efficiency of the blade since the designed shape of the blade profile is no longer maintained.

The edgewise loads can further cause the trailing edge of the blade to deform in a stable post buckling pattern. This is caused by bending of the blade from the leading edge towards the trailing edge. The blade material in the leading edge is then subject to tension and the trailing edge to compression. Since the trailing edge is relative thin, it cannot withstand substantial compression forces before it bends out of its neutral plane. When this happens, some of the load on the trailing edge is transferred to and distributed through part of the shell further away from the trailing edge, until equilibrium of the forces is established. Although this deformation does not immediately lead to failure, it decreases the safety margin for the general failure load of the blade and also increases the peeling and shear stresses in the trailing edge.

Subjected to flapwise loads, the section of the aerodynamic shell between the trailing edge and the internal girder is deforming out of the plane of the surface's "neutral" position in a similar way as described above for the edgewise loads. This deformation also induces shear and peeling stresses in the trailing edge of the blade. The section will deform into a state of "lowest energy level", i.e. a situation wherein as much as possible of the stress in the blade is distributed to other sections of the blade. When part of the shell deforms in this manner, it is usually referred to as an "ineffective panel". The distribution of the stresses to other parts of the blade means that these parts are subjected to a higher load. This will result in a larger tip deflection of the blade. Furthermore, the deformations of the blade's surface compromise the aerodynamic efficiency of the blade, because the designed shape of the profile is no longer maintained.

Thus, there is a need for a wind turbine blade in which deformations of the shell are prevented or minimised and wherein the blade structure is strengthened without increasing the overall weight.

It is yet another object of the present invention to provide a wind turbine blade with increased overall strength and overall stiffness.

It is yet another object of the present invention to provide a wind turbine blade with increased resistance to fatigue failure.

It is therefore an object of the present invention to provide an aerodynamic profile with improved resistance against buckling failure of the profile.

It is yet another object of the present invention to provide a wind turbine blade with increased resistance to buckling of the trailing edge.

It is yet another object of the present invention to provide a wind turbine blade with increased resistance to buckling of the section of the aerodynamic shell between the trailing edge and the internal girder.

It is therefore an object of the present invention to provide a wind turbine blade with improved resistance against deformations of the blade profile.

It is also an object of the present invention to provide a reinforced blade profile for a wind turbine blade.

It is therefore an object of the present invention to provide a wind turbine blade with improved resistance against deformations of the shell.

It is another object of the present invention to provide a wind turbine blade with reduced weight.

It is also an object of the present invention to provide a wind turbine blade with improved reliability of joints between shell parts.

It is a further object to provide a wind turbine blade capable of working under severe aerodynamic loads and to optimise the aerodynamic efficiency, e.g. energy output of the blade.

It is further an object of the present invention to provide alternatives to the prior art.

According to a first aspect of the present invention, the above-mentioned and other objects are fulfilled by a wind turbine blade comprising a shell having a section with an aerodynamic profile, and at least one elongated reinforcing member connected inside the shell for increasing the strength of the blade, each of the at least one elongated reinforcing member having a first end and a second end and extending in a longitudinal direction between the first end and the second end and wherein the first end is connected to the upper part of the shell and the second end is connected to the lower part of the shell.

According to a second aspect of the present invention, the above-mentioned and other objects are fulfilled by a method of increasing the strength of a wind turbine blade having a shell with a section having an aerodynamic profile, the method comprising the steps of positioning at least one elongated reinforcing member inside the shell, each of the at least one elongated reinforcing member having a first end and a second end and extending in a longitudinal direction between the first end and the second end, and connecting the first end to the upper part of the shell and the second end to the lower part of the shell.

The wind turbine blade may be utilized in a vertical axis wind turbine, such as a Darrieus wind turbine, a wind star turbine, etc., or in a horizontal axis wind turbine, such as common modern wind turbines usually three-bladed, sometimes two-bladed or even one-bladed (and counterbalanced), etc.

The blade according to the present invention may also be used in the aeronautical industry, for example as a helicopter wing, an airplane wing, etc.

The wind turbine blade may be applicable not only to wind, but also to a variety of water flows, including free-flow (rivers, creeks), tidal flow, oceanic currents, wave motion, ocean wave surface currents, etc.

The shell of the wind turbine blade may preferably, but not exclusively, comprise a composite or laminated material. The material may preferably, but not exclusively, comprise fibreglass and/or carbon fibres and/or other durable and flexible materials typically with a high strength/weight ratio. This may further comprise at least in part light weight metals or alloys. The shell may typically be a laminate or sandwich-construction.

Preferably, at least one of the at least one elongated reinforcing member extends in a direction that is substantially perpendicular to the longitudinal extension of the blade. In case of a curved blade wherein the longitudinal extension of the blade forms a non-linear curve in space, the reinforcing member extends in a direction that is substantially perpendicular to the longitudinal extension of the blade in the vicinity of the reinforcing member in question.

The elongated reinforcing members may form an angle with the longitudinal extension of the blade in the vicinity of the reinforcing member in question preferably ranging from 70° to 110°, preferably from 80° to 100°, more preferred from 85° to 95°.

The at least one elongated reinforcing member may extend substantially perpendicular to the profile chord of the blade. The profile chord of the blade is an imaginary surface that contains the leading edge and the trailing edge of the blade and extends therebetween. Thus, the edgewise direction is a direction in parallel with the profile chord and the flapwise direction is a direction perpendicular to the profile chord.

The wind turbine blade may comprise a plurality of elongated reinforcing members positioned in spaced relationship along the longitudinal extension of the blade.

The blade according to the invention may also comprise one or more girders. Wind turbine blades with one or more girders are well-known. A conventional girder has a longitudinal extension in the longitudinal direction of the blade and a transverse extension perpendicular to the profile chord of the blade. The one or more conventional girders primarily strengthen the blade along the longitudinal extension of the blade. A girder may also be referred to as a web. The conventional girder or web may be constituted by any type of elongate constructional member capable of taking up loads, such as a beam or a spar, e.g. shaped as an I-profile, preferably made from fibre reinforced plastics or other suitable material. Typically, conventional girders extend along substantially the entire length of the blade.

The at least one elongated reinforcing member may be positioned between the rearmost girder and the trailing edge of the blade.

The at least one elongated reinforcing member is connected with at least two connections to an inner surface of the upper part and the lower part of the shell, respectively. The elongated reinforcing member prevents forces in the edgewise and flapwise direction of the blade from urging the two connections away from each other thereby strengthening the shell against forces in the edgewise and flapwise direction and preventing deformation of the trailing part of the shell. Thus, the elongated reinforcing member desirably has a high tensional strength while the elongated reinforcing member may be, but need not be, capable of resisting compression forces.

Preferably, the elongated reinforcing member has a straight shape. If the shape of the elongated reinforcing member is not straight, the shape of the elongated reinforcing member could be straightened when subjected to stretching forces leading to movement of its end points and obviously, this is not desired.

The elongated reinforcing member may be constituted by any type of elongated constructional member capable of taking up loads.

The elongated reinforcing member may comprise one or more elements selected from the group consisting of a rod, a plate, and a tube, capable of resisting both compression forces and tensional forces.

Since, the reinforcing element need not be capable of resisting compression forces, the elongated reinforcing member may further comprise one or more elements selected from the group consisting of a wire, a rope, a thread, a fibre, and a web of fabric.

The elements may have any suitable cross-section, for example a substantially round or polygonal cross-section, such as substantially rectangular, triangular, circular, oval, elliptical, etc, but is preferably circular or oval.

The elements may be applied individually or may be applied as a number of individual elements together forming a "thicker" element. Particularly, the element may comprise fibres of very high stiffness and strength such as, glass fibres, carbon fibres, aramid fibres, polyethylene fibres, PBO fibres (polypheylene benzobisoxqazole), etc.

The elongated reinforcing members may be made of any suitable material. Fibre reinforced plastic is presently preferred for rods, plates and tubes.

The elongated reinforcing members may also be made of wood, such as bamboo, birch, plywood, etc.

The elongated reinforcing member may also be made of steel, light metal alloys, etc.

The elongated reinforcing members may also be made of material based on plant fibres with high cellulose content, such as bast fibres, such as flax, jute, etc. These fibres may be used as reinforcement in a composite material, such as a reinforced plastic, or may be used in the form of wires or rods. The elongated reinforcing member may also be made of a combination of the above mentioned materials.

The elongated reinforcing member is required to have a high tensional strength only, i.e. preferably, the elongated reinforcing member need not carry other loads so that the elongated reinforcing member may be thin whereby its weight and cost are kept at a minimum. The thickness of the elongated reinforcing member is preferably less than 10 times the maximum thickness of the shell, more preferred less than 5 times the maximum thickness of the shell, still more preferred less than 2 times the maximum thickness of the shell, most preferred less than the maximum thickness of the shell.

The connections on the inner surface of the profile may in principle be positioned anywhere on the inner surface but it should be observed that the chosen positioning is suitable for the elongated reinforcing member to be able to provide a reasonable and useful reinforcing effect to the blade. The connections may comprise any suitable kind of joint such as welded, glued, melted, fused or other simple mechanical connections. The elongated reinforcing member itself may comprise the connections or it may comprise additional connections or connection parts adapted to engage or cooperate with the connections on the inner surface of the shell. The additional connections or connection parts must be sufficiently rigid to maintain their shape when subjected to tension in order to properly cooperate with the elongated reinforcing member to prevent the connections on the shells from being displaced away from each other.

The connections may be releasable connections that may comprise any suitable kind of joint, such as a snap-fit, press-fit, groove-and-tongue connection or other simple mechanical connection. A releasable interconnection may be used to provide an aerodynamic profile with an increased degree of flexibility.

The elongated reinforcing member secures and keeps the shape of the shell substantially unchanged when the aerodynamic profile is loaded by forces in the edgewise and flapwise direction. This in turn causes the overall strength of the aerodynamic profile to increase significantly since the resistance against buckling is increased. With the elongated reinforcing member according to the invention, the dimensions of the material(s) used for the profile's shell may further be drastically reduced compared to currently available solutions and thus facilitates lower dynamic loads on the other parts of the system, improved handling and transportation characteristics of the profile and a reduction of material costs.

An elongated reinforcing member according to the present invention improves the aerodynamic efficiency of the blade since the designed shape of the blade profile is maintained to a higher degree than for a conventional blade.

One of the at least one elongated reinforcing member may form an angle with another elongated member of the at least one elongated reinforcing member.

The angle may range from 15° to 135°. Preferably, the at least one elongated reinforcing member extends substantially perpendicular to the profile chord of the blade in a cross-section along the longitudinal extension of the blade.

Two or more elongated reinforcing members may be positioned in spaced relationship along at least a part of the longitudinal extension of the blade in such a way that neighbouring elongated reinforcing members are mounted with different angles in relation to the profile chord of the blade. The distance between adjacent ends of neighbouring elongated reinforcing members may not exceed 2×D, wherein D is the spanning distance of one of the elongated reinforcing members, i.e. the distance between two opposing connections to the shell of the elongated reinforcing member. The value of parameter D may be identical for two or more neighbouring elongated reinforcing members.

However, since the width of the cross-section of the wind turbine blade typically decreases towards the tip of the blade, the distance $D2$ of a elongated reinforcing member located closer to the tip will be smaller than the distance $D1$ of a elongated reinforcing member located closer to the hub of the wind turbine. The resulting maximum distance between two neighbouring elongated reinforcing members may preferably be calculated based on the minimum of the two distances, i.e. distance $D2$, or based on the mean value of $D1$ and $D2$. It has been found that values of the resulting distance D fulfilling this relationship, there is a good balance between the elongated reinforcing members' ability to take up the shear forces, the total weight of the wind turbine blade and the blade's stiffness. However, the maximum distance between two elongated reinforcing members may in stead be based on other requirements, such as, but not limited to, a need for a particularly strong wind turbine blade design, e.g. when the wind turbine is intended to be subjected to repeatedly severe weather conditions, such as when erected at open sea.

The elongated reinforcing members may be positioned in certain sections of the blade only possibly without any predetermined or calculated maximum distance. Particularly, but not exclusively, the elongated reinforcing members may be located at positions wherein a substantial deformation of the section between the trailing edge of the blade and the girder is expected or established.

The reinforcing element(s) may be equipped with or may consist of active installations, such as piezoelectric installations, that may be activated by means of voltage, current, electric or magnetic field, whereby the length of the reinforcing element changes and/or stresses are imposed on the element. By this it is possible to change the curvature of the profile's surface and thereby change the aerodynamic properties of the profile. With these installations it is possible to optimize the performance of the aerodynamic profile.

Figure 2:
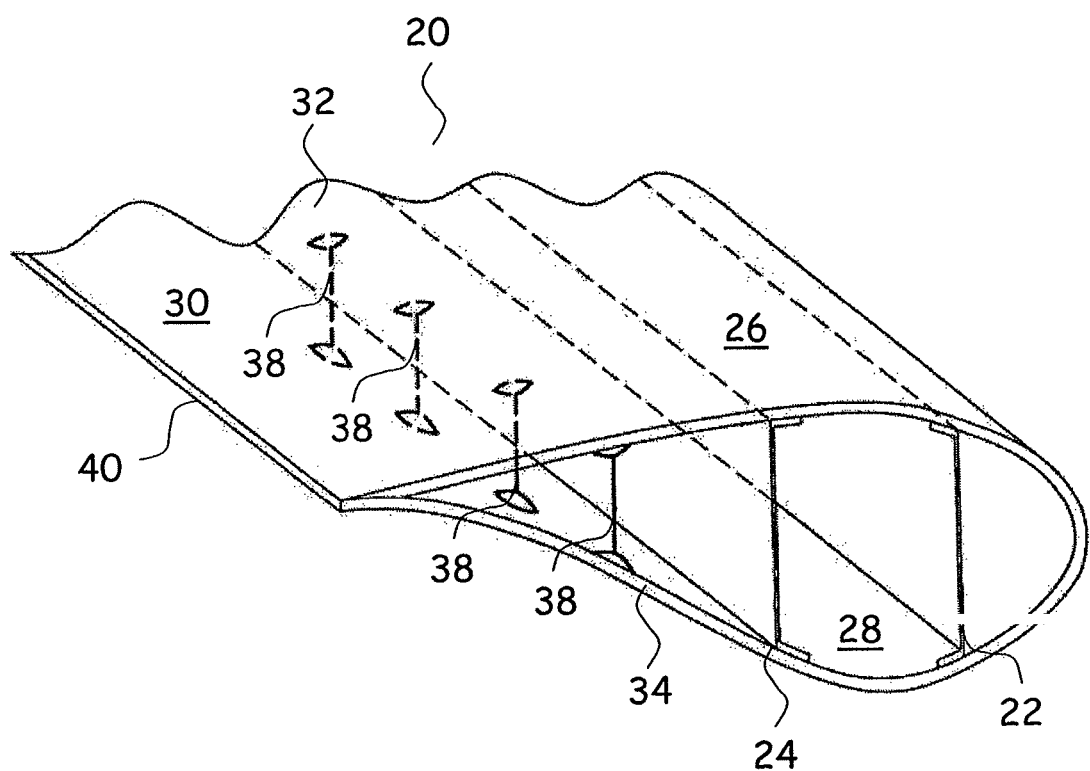
Figure 3:
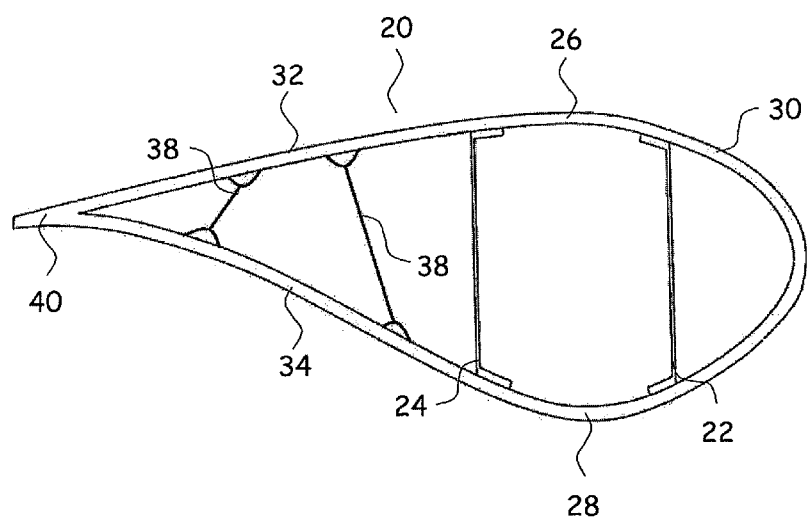
Figure 4:
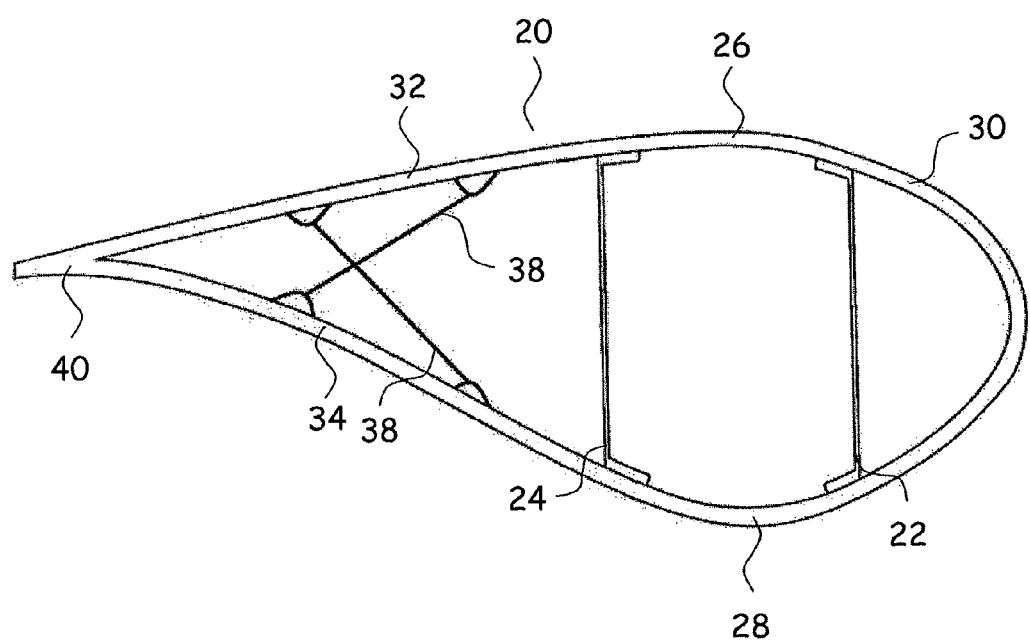
Figure 5:
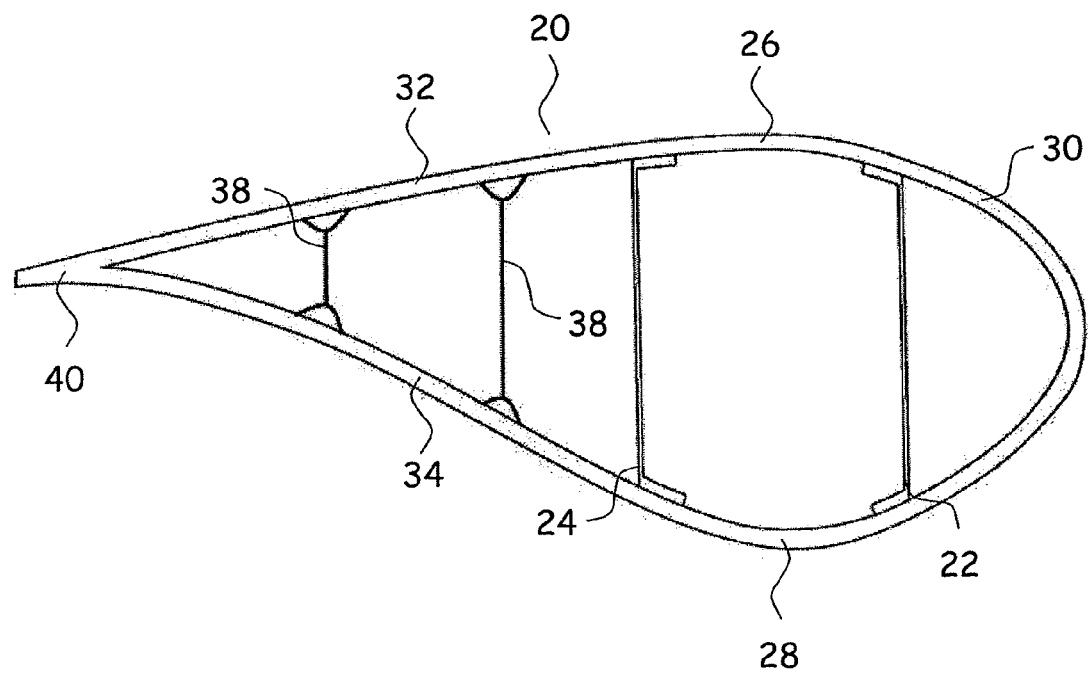
Figure 6:
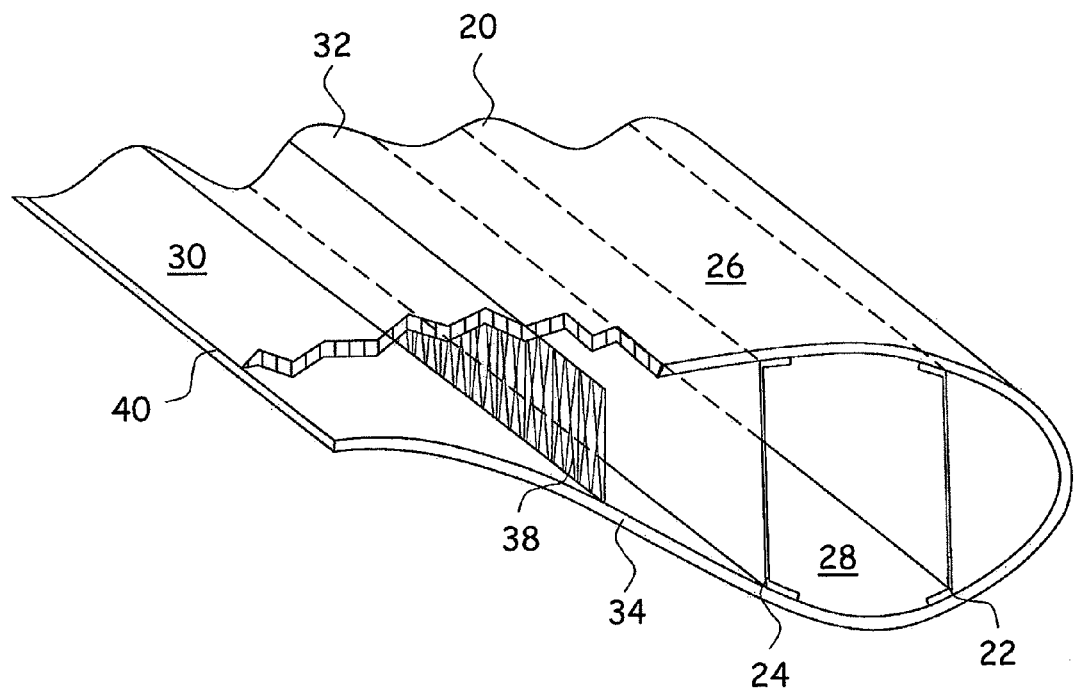
Figure 7:
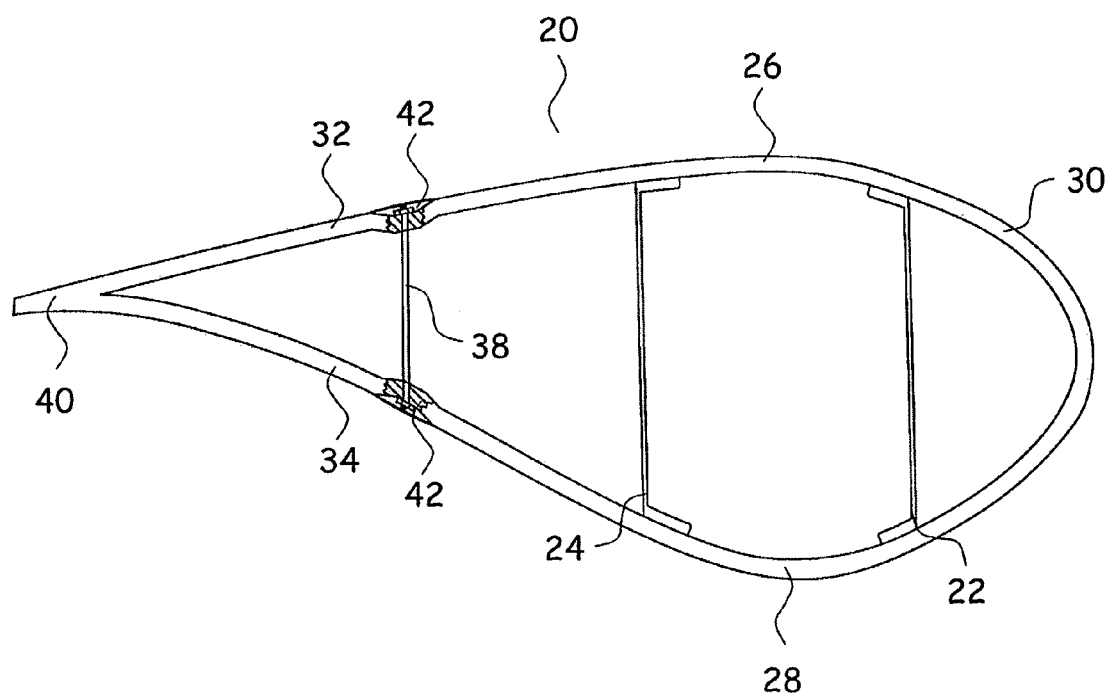
Figure 8:
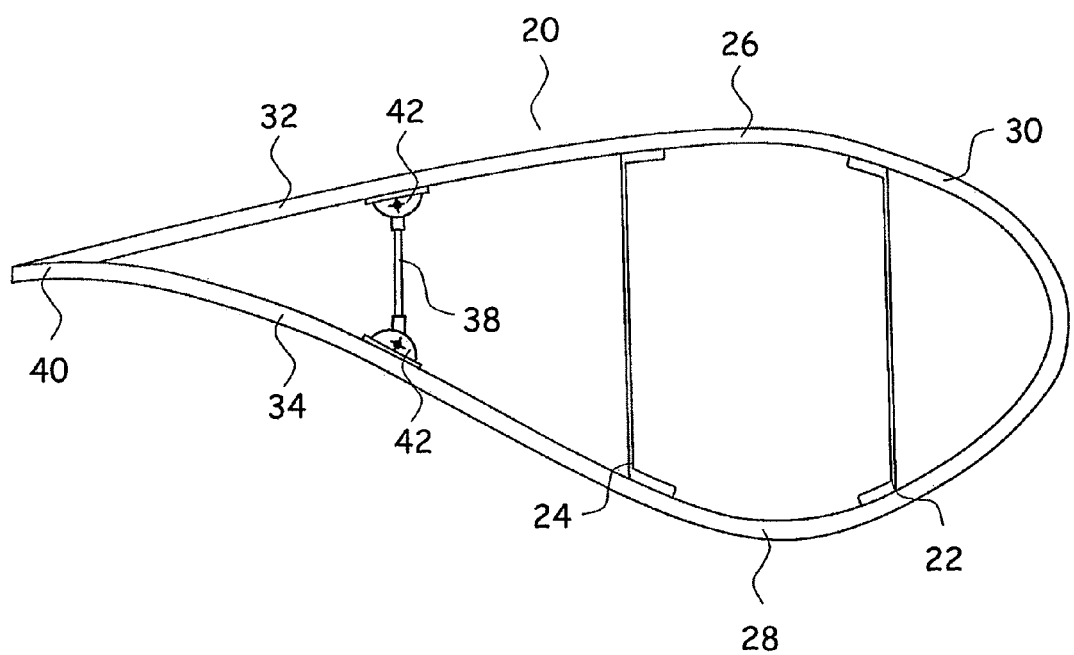
Figure 9:
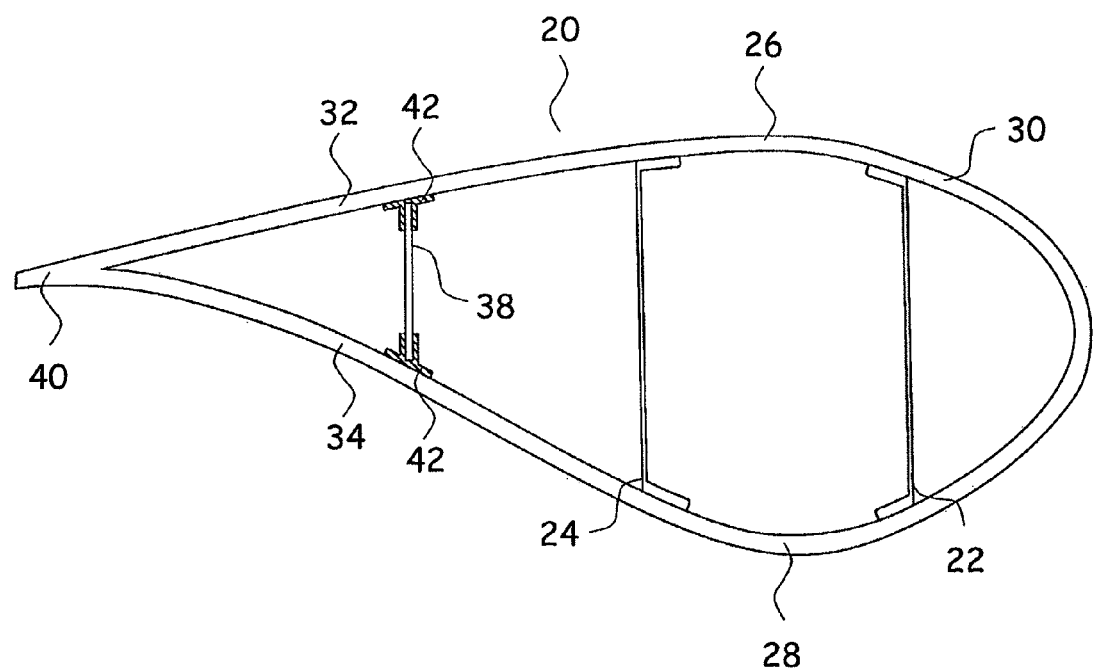
Figure 11:
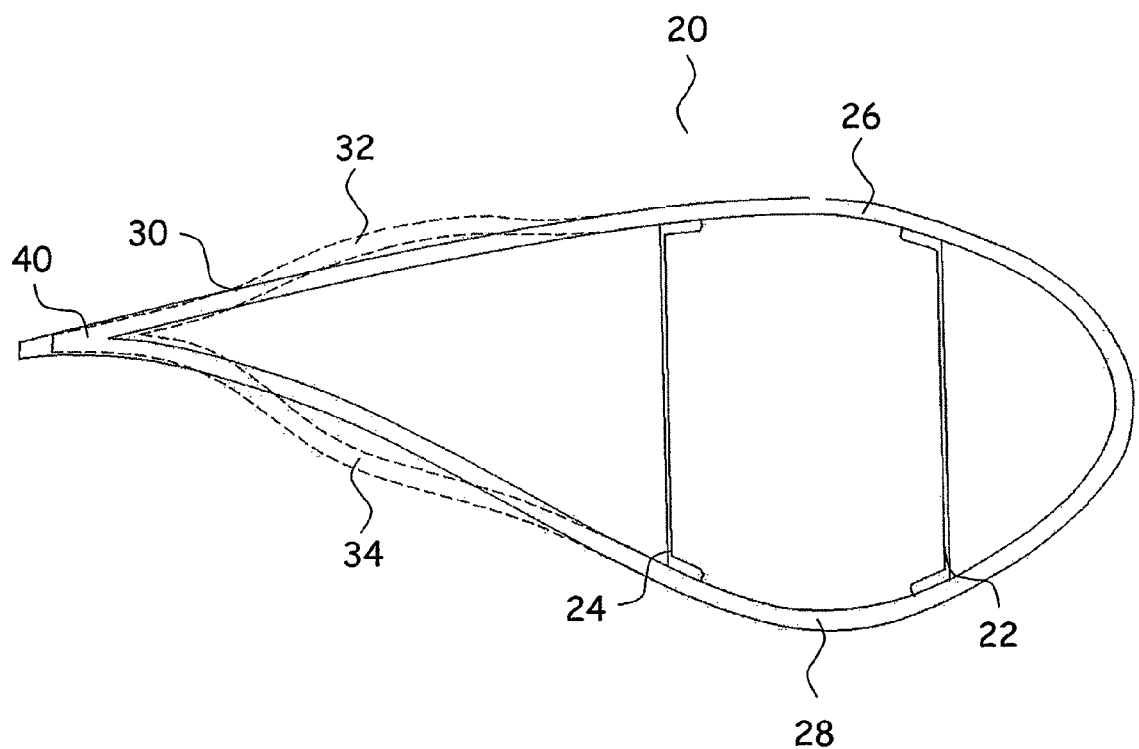

Below the invention will be described in more detail with reference to the exemplary embodiments illustrated in the drawings, wherein FIG. 1 schematically illustrates in perspective a wind turbine blade and arrows indicating the directions of flapwise, edgewise, and torsional loads, respectively, FIG. 2 schematically illustrates in perspective a part of a wind turbine blade with elongated reinforcing members interconnecting the upper and lower part of the shell, FIG. 3 shows a schematic cross-section of a wind turbine blade with angled elongated reinforcing members, FIG. 4 shows a schematic cross-section of a wind turbine blade with angled and crossing elongated reinforcing members, FIG. 5 shows a schematic cross-section of a wind turbine blade with two rows of elongated reinforcing members, FIG. 6 schematically illustrates in perspective a part of a wind turbine blade with elongated reinforcing members forming a web capable of resisting tension forces only, FIG. 7 shows an example of connections of an elongated reinforcing member to the shell, FIG. 8 shows another example of connections of an elongated reinforcing member to the shell, FIG. 9 shows yet another example of connections of an elongated reinforcing member to the shell, FIG. 10 shows still yet another example of connections of an elongated reinforcing member to the shell, and FIG. 11 shows a schematic cross-section of a conventional wind turbine blade distorted by edgewise and flapwise forces.

The present invention will now be described more fully hereinafter with reference to the accompanying drawings, in which exemplary embodiments of the invention are shown. The figures are schematic and simplified for clarity, and they merely show details which are essential to the understanding of the invention, while other details have been left out. Throughout, the same reference numerals are used for identical or corresponding parts.

In addition to the shown embodiments, the invention may be embodied in different forms and should not be construed as limited to the embodiments set forth herein. Rather, these embodiments are provided so that this disclosure will be thorough and complete, and will fully convey the scope of the invention to those skilled in the art.

FIG. 1 schematically illustrates in perspective a wind turbine blade 1 and arrows indicating the directions of flapwise F, edgewise E, and torsional T loads, respectively. The dashed line 12 indicates the longitudinal extension of the blade. The co-ordinates system 14 has an x-axis in the edgewise direction, an y-axis in flapwise direction, and a z-axis in the direction of the longitudinal extension of the blade 1. The cross-section S1 is parallel with the xy-plane of the co-ordinate system 14, and S1 is also shown in FIGS. 2a, 2b, and 3.

FIG. 2 schematically illustrates in perspective a part of a wind turbine blade 20 with two girders 22, 24 and an upper thickened cap part 26 and a lower thickened cap part 28 of the shell 30. The two girders 22, 24 and thickened cap parts 26, 28 of the blade 20 constitute a box profile. The illustrated embodiment further has a plurality of elongated reinforcing members 38 interconnecting the upper part 32 and the lower part 34 of the shell 30. The elongated reinforcing members 38 are positioned between the girder 24 and the trailing edge 40 of the blade at substantially the same distance from the girder 24.

In another embodiment, different elongated reinforcing members 38 may be positioned with different distances to the trailing edge of the blade. The distance may for example vary along the longitudinal extension of the blade to provide useful reinforcement of the blade, e.g. the relative position of the elongated reinforcing members may be kept constant along the longitudinal extension of the blade; for example in one row, the distance between each of the elongated reinforcing members and the girder 24 may be 0.25 times the distance between the girder 24 and the trailing edge 40 at the position of the elongated reinforcing member in question.

Preferably, each of the elongated reinforcing members 38 extends substantially perpendicular to the profile chord of the blade 20.

In another embodiment, the angles of the elongated reinforcing members in relation to the profile chord of the blade vary along the longitudinal extension of the blade, for example in order to compensate for a twist of the blade along the longitudinal extension of the blade, or, in order to compensate for varying thickness of the shell of the blade, etc.

In the illustrated embodiment, each of the elongated reinforcing members 38 is bonded to the internal surface of the shell 30.

The elongated reinforcing members 38 may be flexible wires with high tensional strength without a capability of resisting compression forces.

The elongated reinforcing members 38 may be rods capable of resisting both compression forces and tension forces.

In both cases, the elongated reinforcing members prevent forces in the edgewise and flapwise direction of the blade from urging the two connections away from each other thereby strengthening the shell against deformation by forces in the edgewise and flapwise direction and in turn significantly reducing load of the adhesive joint of the trailing edge.

Furthermore, strengthening against deformation increases the resistance of the blade against fatigue failure of the girder and/or fatigue failure of the shell and/or fatigue failure in the connection between the girder and the shell.

Further, strengthening against deformation increases the resistance of the blade against buckling of the shell thereby increasing the ultimate strength of the blade because the shell is load bearing.

The elongated reinforcing members also increase the blades resistance to buckling of the trailing edge caused by edgewise loads and thereby increase the safety margin for the general failure load of the blade and also decrease the peeling and shear stresses in the trailing edge.

The elongated reinforcing members also increase the blades resistance of deforming out of the plane of the surface's "neutral" position of the section of the aerodynamic shell between the trailing edge and the internal girder. This decreases the shear and peeling stresses in the trailing edge of the blade and result in a smaller tip deflection of the blade.

Furthermore, the aerodynamic efficiency of the blade is also improved since the designed shape of the shell is maintained to a higher degree than for a conventional blade.

FIG. 3 schematically shows a cross-section along the transverse extension of a wind turbine blade 20 with two girders 22, 24 and an upper thickened cap part 26 and a lower thickened cap part 28 of the shell 30. The two girders 22, 24 and thickened cap parts 26, 28 of the blade 20 constitute a box profile. The illustrated embodiment further has a plurality of elongated reinforcing members 38 interconnecting the upper part 32 and the lower part 34 of the shell 30. The elongated reinforcing members 38 are positioned between the girder 24 and the trailing edge 40 of the blade in two rows with different distances to the girder 24. In each row, each of the elongated reinforcing members is positioned at substantially the same distance from the girder 24.

In another embodiment, different elongated reinforcing members 38 within the same row may be positioned with different distances to the trailing edge of the blade. The distance may for example vary along the longitudinal extension of the blade to provide useful reinforcement of the blade, e.g. the relative position of the elongated reinforcing members may be kept constant along the longitudinal extension of the blade; for example in one row, the distance between each of the elongated reinforcing members and the girder 24 may be 0.25 times the distance between the girder 24 and the trailing edge 40 at the position of the elongated reinforcing member in question.

Each of the elongated reinforcing members 38 extends substantially perpendicular to the profile chord in a cross-section along the longitudinal extension of the blade 20. Further, each of the elongated reinforcing members 38 forms an oblique angle with the profile chord of the blade 20 in a cross-section along the transverse extension of the blade. Elongated reinforcing members in the same row are positioned in parallel, and elongated reinforcing members in different rows are positioned with different angles.

In another embodiment, within each row of elongated reinforcing members, the angles of the elongated reinforcing members in relation to the profile chord of the blade vary along the longitudinal extension of the blade, for example in order to compensate for a twist of the blade along the longitudinal extension of the blade, or, in order to compensate for varying thickness of the shell of the blade, etc.

The number of rows of elongated reinforcing members may vary along the length of the blade, e.g. more rows are positioned in sections of the blade having a large width while a single row or few rows are positioned in sections of the blade having a narrow width.

In the illustrated embodiment, each of the elongated reinforcing members 38 is bonded to the internal surface of the shell 30.

The elongated reinforcing members 38 may be flexible wires with high tensional strength without a capability of resisting compression forces.

The elongated reinforcing members 38 may be rods capable of resisting both compression forces and tension forces.

In both cases, the elongated reinforcing members prevent forces in the edgewise and flapwise direction of the blade from urging the two connections away from each other thereby strengthening the shell against deformation by forces in the edgewise and flapwise direction and in turn significantly reducing load of the adhesive joint of the trailing edge.

Furthermore, strengthening against deformation increases the resistance of the blade against fatigue failure of the girder and/or fatigue failure of the shell and/or fatigue failure in the connection between the girder and the shell.

Further, strengthening against deformation increases the resistance of the blade against buckling of the shell thereby increasing the ultimate strength of the blade because the shell is load bearing.

The elongated reinforcing members also increase the blades resistance to buckling of the trailing edge caused by edgewise loads and thereby increase the safety margin for the general failure load of the blade and also decrease the peeling and shear stresses in the trailing edge.

The elongated reinforcing members also increase the blades resistance of deforming out of the plane of the surface's "neutral" position of the section of the aerodynamic shell between the trailing edge and the internal girder. This decreases the shear and peeling stresses in the trailing edge of the blade and result in a smaller tip deflection of the blade.

Furthermore, the aerodynamic efficiency of the blade is also improved since the designed shape of the shell is maintained to a higher degree than for a conventional blade.

FIG. 4 schematically shows a cross-section along the transverse extension of a wind turbine blade 20 with two girders 22, 24 and an upper thickened cap part 26 and a lower thickened cap part 28 of the shell 30. The two girders 22, 24 and thickened cap parts 26, 28 of the blade 20 constitute a box profile. The illustrated embodiment further has a plurality of elongated reinforcing members 38 interconnecting the upper part 32 and the lower part 34 of the shell 30. The elongated reinforcing members 38 are positioned between the girder 24 and the trailing edge 40 of the blade in one row in which each of the elongated reinforcing members is positioned at substantially the same distance from the girder 24 in a crossing relationship whereby every second elongated reinforcing member is positioned in parallel with each other, and adjacent elongated reinforcing members form an angle with each other so that every second elongated reinforcing member forms a first angle with the profile chord of the blade in a transverse cross-section of the blade, and the elongated reinforcing members in between form a second angle with the profile chord of the blade in a transverse cross-section of the blade. Further, each of the elongated reinforcing members 38 extends substantially perpendicular to the profile chord in a cross-section along the longitudinal extension of the blade 20.

In another embodiment, different elongated reinforcing members 38 within the row may be positioned with different distances to the trailing edge of the blade. The distance may for example vary along the longitudinal extension of the blade to provide an efficient and useful reinforcement of the blade, e.g. the relative position of the elongated reinforcing members may be kept constant along the longitudinal extension of the blade; for example in one row, the distance between each of the elongated reinforcing members and the girder 24 may be 0.25 times the distance between the girder 24 and the trailing edge 40 at the position of the elongated reinforcing member in question.

Further, the above-mentioned first and second angles of the elongated reinforcing members in relation to the profile chord of the blade may vary along the longitudinal extension of the blade, for example in order to compensate for a twist of the blade along the longitudinal extension of the blade, or, in order to compensate for varying thickness of the shell of the blade, etc.

In the illustrated embodiment, each of the elongated reinforcing members 38 is bonded to the internal surface of the shell 30.

The elongated reinforcing members 38 may be flexible wires with high tensional strength without a capability of resisting compression forces.

The elongated reinforcing members 38 may be rods capable of resisting both compression forces and tension forces.

In both cases, the elongated reinforcing members prevent forces in the edgewise and flapwise direction of the blade from urging the two connections away from each other thereby strengthening the shell against deformation by forces in the edgewise and flapwise direction and in turn significantly reducing load of the adhesive joint of the trailing edge.

Furthermore, strengthening against deformation increases the resistance of the blade against fatigue failure of the girder and/or fatigue failure of the shell and/or fatigue failure in the connection between the girder and the shell.

Further, strengthening against deformation increases the resistance of the blade against buckling of the shell thereby increasing the ultimate strength of the blade because the shell is load bearing.

The elongated reinforcing members also increase the blades resistance to buckling of the trailing edge caused by edgewise loads and thereby increase the safety margin for the general failure load of the blade and also decrease the peeling and shear stresses in the trailing edge.

The elongated reinforcing members also increase the blades resistance of deforming out of the plane of the surface's "neutral" position of the section of the aerodynamic shell between the trailing edge and the internal girder. This decreases the shear and peeling stresses in the trailing edge of the blade and result in a smaller tip deflection of the blade.

Furthermore, the aerodynamic efficiency of the blade is also improved since the designed shape of the shell is maintained to a higher degree than for a conventional blade.

FIG. 5 schematically shows a cross-section of a wind turbine blade 20 with two girders 22, 24 and an upper thickened cap part 26 and a lower thickened cap part 28 of the shell 30. The two girders 22, 24 and thickened cap parts 26, 28 of the blade 20 constitute a box profile. The illustrated embodiment further has a plurality of elongated reinforcing members 38 interconnecting the upper part 32 and the lower part 34 of the shell 30. The elongated reinforcing members 38 are positioned between the girder 24 and the trailing edge 40 of the blade in two rows with different distances to the girder 24. In each row, each of the elongated reinforcing members is positioned at substantially the same distance from the girder 24. Each of the elongated reinforcing members 38 extends substantially perpendicular to the profile chord of the blade 20.

In another embodiment, different elongated reinforcing members 38 within the same row may be positioned with different distances to the trailing edge of the blade. The distance may for example vary along the longitudinal extension of the blade to provide an efficient and useful reinforcement of the blade, e.g. the relative position of the elongated reinforcing members may be kept constant along the longitudinal extension of the blade; for example in one row, the distance between each of the elongated reinforcing members and the girder 24 may be 0.25 times the distance between the girder 24 and the trailing edge 40 at the position of the elongated reinforcing member in question.

In another embodiment, within each row of elongated reinforcing members, the angles of the elongated reinforcing members in relation to the profile chord of the blade vary along the longitudinal extension of the blade, for example in order to compensate for a twist of the blade along the longitudinal extension of the blade, or, in order to compensate for varying thickness of the shell of the blade, etc.

The number of rows of elongated reinforcing members may vary along the length of the blade, e.g. more rows are positioned in sections of the blade having a large width while a single row or few rows are positioned in sections of the blade having a narrow width.

In the illustrated embodiment, each of the elongated reinforcing members 38 is bonded to the internal surface of the shell 30.

The elongated reinforcing members 38 may be flexible wires with high tensional strength without a capability of resisting compression forces.

The elongated reinforcing members 38 may be rods capable of resisting both compression forces and tension forces.

In both cases, the elongated reinforcing members prevent forces in the edgewise and flapwise direction of the blade from urging the two connections away from each other thereby strengthening the shell against deformation by forces in the edgewise and flapwise direction and in turn significantly reducing load of the adhesive joint of the trailing edge.

Furthermore, strengthening against deformation increases the resistance of the blade against fatigue failure of the girder and/or fatigue failure of the shell and/or fatigue failure in the connection between the girder and the shell.

Further, strengthening against deformation increases the resistance of the blade against buckling of the shell thereby increasing the ultimate strength of the blade because the shell is load bearing.

The elongated reinforcing members also increase the blades resistance to buckling of the trailing edge caused by edgewise loads and thereby increase the safety margin for the general failure load of the blade and also decrease the peeling and shear stresses in the trailing edge.

The elongated reinforcing members also increase the blades resistance of deforming out of the plane of the surface's "neutral" position of the section of the aerodynamic shell between the trailing edge and the internal girder. This decreases the shear and peeling stresses in the trailing edge of the blade and result in a smaller tip deflection of the blade.

Furthermore, the aerodynamic efficiency of the blade is also improved since the designed shape of the shell is maintained to a higher degree than for a conventional blade.

FIG. 6 schematically illustrates in perspective a part of a wind turbine blade 20 with two girders 22, 24 and an upper thickened cap part 26 and a lower thickened cap part 28 of the shell 30. The two girders 22, 24 and thickened cap parts 26, 28 of the blade 20 constitute a box profile. The illustrated embodiment further has a plurality of elongated reinforcing members, namely fibres 38, positioned adjacent each other to form a web that interconnects the upper part 32 and the lower part 34 of the shell 30. The individual fibres 38 form varying angles with relation to the longitudinal extension of the blade, e.g. in the range from 80° to 100°, and some of the fibres 38 cross each other to form the web. The illustrated fibres have a high resistance against tension forces only. The web formed by the elongated reinforcing members 38 is positioned between the girder 24 and the trailing edge 40 of the blade and extend substantially in parallel with the girder 24 and substantially perpendicular to the profile chord of the blade 20. In another embodiment, the web may consist of a fabric with most of the fibres oriented substantially perpendicular to the longitudinal extension of the blade.

In the illustrated embodiment, the distance between the web and the trailing edge of the blade is constant along the longitudinal extension of the blade. In another embodiment, the distance varies along the longitudinal extension of the blade to provide an efficient and useful reinforcement of the blade, e.g. the relative position of the web may be kept constant along the longitudinal extension of the blade; for example, the distance between the web and the girder 24 may be 0.25 times the distance between the girder 24 and the trailing edge 40 along the longitudinal extension of the web.

The web extends substantially perpendicular to the profile chord in a cross-section along the transverse extension of the blade 20. In another embodiment, the web forms an oblique angle with the profile chord of the blade 20 in a cross-section along the transverse extension of the blade. The angle may be constant along the longitudinal extension of the blade, or the angle may vary along the longitudinal extension of the blade, for example in order to compensate for a twist of the blade along the longitudinal extension of the blade, or, in order to compensate for varying thickness of the shell of the blade, etc.

In the illustrated embodiment, the web is bonded to the internal surface of the shell 30.

The web preferably comprises fibres 38 of very high stiffness and strength such as, but not limited to, aramid fibres. The web prevents forces in the edgewise and flapwise direction of the blade 20 from urging connections to the upper part 32 of the shell 30 away from respective connections to the lower part 34 of the shell 30 thereby strengthening the shell 30 against forces in the edgewise and flapwise direction and in turn significantly reducing load of the adhesive joint of the trailing edge 40. Furthermore, the aerodynamic efficiency of the blade 20 is also improved since the designed shape of the shell 30 is maintained to a higher degree than for a conventional blade.

Furthermore, strengthening against deformation increases the resistance of the blade against fatigue failure of the girder and/or fatigue failure of the shell and/or fatigue failure in the connection between the girder and the shell.

Further, strengthening against deformation increases the resistance of the blade against buckling of the shell thereby increasing the ultimate strength of the blade because the shell is load bearing.

The web also increases the blades resistance to buckling of the trailing edge caused by edgewise loads and thereby increase the safety margin for the general failure load of the blade and also decrease the peeling and shear stresses in the trailing edge.

The web also increases the blades resistance of deforming out of the plane of the surface's "neutral" position of the section of the aerodynamic shell between the trailing edge and the internal girder. This decreases the shear and peeling stresses in the trailing edge of the blade and result in a smaller tip deflection of the blade.

Furthermore, the aerodynamic efficiency of the blade is also improved since the designed shape of the shell is maintained to a higher degree than for a conventional blade.

FIG. 7 schematically shows a cross-section of a wind turbine blade 20 similar to the embodiment of FIG. 2, but with mechanical connections 42 between the elongated reinforcing members 38 and the shell 30.

In the illustrated embodiment, the reinforcing members 38 are mechanically connected to the shell 30 by leading each of the reinforcing members 38 through suitable openings in the upper part 32 and lower part 34, respectively, of the shell 30 and fastening them by means of a mechanical connection 42, such as a nut engaging with a threaded section of the end parts of the reinforcing members 38. Indentations are provided in the upper part 32 and lower part 34, respectively, of the shell 30 to accommodate the nuts. Subsequent to assembly of the mechanical connections, the indentations are covered by a plate or foil, or the cavity can be filled with foam, adhesive or filler material in order to maintain a smooth aerodynamic profile of the shell 30. Preferably, material already used in the blade such as fibre reinforced plastic could be used.

FIG. 8 schematically shows a cross-section of a wind turbine blade 20 similar to the embodiment of FIG. 7, but with another type of connections 42 between the elongated reinforcing members 38 and the shell 30.

In the illustrated embodiment, the reinforcing members 38 are connected to the shell 30 with anchors 42. The anchors 42 are bonded to the inner surface of the upper part 32 and lower part 34, respectively, of the shell 30. The elongated reinforcing members 38 are connected to the anchor by interconnecting pins inserted through the anchor and the member.

FIG. 9 schematically shows a cross-section of a wind turbine blade 20 similar to the embodiment of FIG. 8, but with another type of anchors 42 between the elongated reinforcing members 38 and the shell 30. The anchors may be bonded to the shell and the elongated reinforcing member, or the anchor may be laminated to the shell and the member. This can be made using fibre reinforced plastic and is also known as secondary lamination.

In the illustrated embodiment, the reinforcing members 38 are connected to the shell 30 with anchors 42. The anchors 42 are bonded to the inner surface of the upper part 32 and lower part 34, respectively, of the shell 30. The elongated reinforcing members 38 are received between two receiving surfaces of the anchors 42 and the elongated reinforcing members 38 are bonded or adhered to the anchors 42.

FIG. 10 schematically illustrates in perspective a part of a wind turbine blade 20 with two girders 22, 24 and an upper thickened cap part 26 and a lower thickened cap part 28 of the shell 30. The two girders 22, 24 and thickened cap parts 26, 28 of the blade 20 constitute a box profile. The illustrated blade 20 further has a plurality of elongated reinforcing members 38 formed by a wire 44 that is drawn, sewn or stitched alternatingly through the upper part 32 and the lower part 34 of the shell 30 so that it extends along the inner or outer part of the respective upper part 32 and lower part 34 of the shell 30, respectively, between adjacent elongated reinforcing members 38.

In the illustrated wind turbine blade 20, the wire 44 extends along the outer part of the shell 30. The insert 46 shows an enlarged detail of the passage of the wire 44 through the shell 30. In order to maintain a smooth aerodynamic outer surface of the shell 30, the wire 44 may have a small diameter and/or the shell may have a recess for accommodation of the wire 44 and/or the wire 44 may be covered by a laminate.

Preferably, the wire 44 forms an angle that is substantially perpendicular to the profile chord of the blade 20 between the upper part 32 and the lower part 34 of the shell 30; however, the individual reinforcing members 38 may form varying angles with relation to the longitudinal extension of the blade, e.g. in the range from 80° to 100°. The wire 44 has a high resistance against tension forces only. The elongated reinforcing members 38 formed by the wire 44 are positioned between the girder 24 and the trailing edge 40 of the blade 20 and extend substantially in parallel with the girder 24.

The distance between the wire and the trailing edge of the blade is preferably constant along the longitudinal extension of the blade. However, the distance may vary along the longitudinal extension of the blade to provide an efficient and useful reinforcement of the blade, e.g. the relative position of the wire 44 may be kept constant along the longitudinal extension of the blade; for example, the distance between the wire 44 and the girder 24 may be 0.25 times the distance between the girder 24 and the trailing edge 40 along the longitudinal extension of the blade.

The wire 44 preferably extends substantially perpendicular to the profile chord in a cross-section along the transverse extension of the blade 20. However, the wire may form an oblique angle with the profile chord of the blade 20 in a cross-section along the transverse extension of the blade. The angle may be constant along the longitudinal extension of the blade, or the angle may vary along the longitudinal extension of the blade, for example in order to compensate for a twist of the blade along the longitudinal extension of the blade, or, in order to compensate for varying thickness of the shell of the blade, etc.

The wire may be bonded to the surface of the shell 30.

The wire preferably comprises fibres 38 of very high stiffness and strength such as, but not limited to, aramid fibres. The wire prevents forces in the edgewise and flapwise direction of the blade 20 from urging connections to the upper part 32 of the shell 30 away from respective connections to the lower part 34 of the shell 30 thereby strengthening the shell 30 against forces in the edgewise and flapwise direction and in turn significantly reducing load of the adhesive joint of the trailing edge 40. Furthermore, the aerodynamic efficiency of the blade 20 is also improved since the designed shape of the shell 30 is maintained to a higher degree than for a conventional blade.

Furthermore, strengthening against deformation increases the resistance of the blade against fatigue failure of the girder and/or fatigue failure of the shell and/or fatigue failure in the connection between the girder and the shell.

Further, strengthening against deformation increases the resistance of the blade against buckling of the shell thereby increasing the ultimate strength of the blade because the shell is load bearing.

The wire also increases the blades resistance to buckling of the trailing edge caused by edgewise loads and thereby increase the safety margin for the general failure load of the blade and also decrease the peeling and shear stresses in the trailing edge.

The wire also increases the blades resistance of deforming out of the plane of the surface's "neutral" position of the section of the aerodynamic shell between the trailing edge and the internal girder. This decreases the shear and peeling stresses in the trailing edge of the blade and result in a smaller tip deflection of the blade.

Furthermore, the aerodynamic efficiency of the blade is also improved since the designed shape of the shell is maintained to a higher degree than for a conventional blade.

FIG. 11 schematically shows a cross-section of a wind turbine blade 20 with two girders 22, 24 and an upper thickened cap part 26 and a lower thickened cap part 28 of the shell 30. The two girders 22, 24 and thickened cap parts 26, 28 of the blade 20 constitute a box profile. The un-loaded aero-dynamic profile of the shell is shown with a solid line, and the distorted profile is shown with a dashed line.

When a blade is subjected to edgewise loading the section of the shell between a trailing edge of the blade and the internal girder is deforming out of the plane of the "neutral" (or initial) plane of the surface as shown in FIG. 10. This deformation induces peeling stresses in the trailing edge of the blade and consequently this can lead to a fatigue failure in the adhesive joint of the trailing edge where the two shell parts are connected to each other. Furthermore, the deformation of the of the shell can lead to deformations in both the shell and the girder at the connection between the girder and the shell and this can lead to fatigue failure of the girder and/or fatigue failure of the shell and/or fatigue failure in the connection between the girder and the shell.

The fatigue failure in the trailing edge, the shell, girder or the connections may then ultimately cause the blade to break apart.

The deformation can also lead to buckling of the shell and this reduces the ultimate strength of the blade because the shell is load bearing. Furthermore, the deformations also compromise the aerodynamic efficiency of the blade since the designed shape of the blade profile is no longer maintained.

The edgewise loads can further cause the trailing edge of the blade to deform in a stable post buckling pattern. This is caused by bending of the blade from the leading edge towards the trailing edge. The blade material in the leading edge is then subject to tension and the trailing edge to compression. Since the trailing edge is relative thin, it cannot withstand substantial compression forces before it bends out of its neutral plane. When this happens, some of the load on the trailing edge is transferred to and distributed through part of the shell further away from the trailing edge, until equilibrium of the forces is established. Although this deformation does not immediately lead to failure, it decreases the safety margin for the general failure load of the blade and also increases the peeling and shear stresses in the trailing edge.

Subjected to flapwise loads, the section of the aerodynamic shell between the trailing edge and the internal girder is deforming out of the plane of the surface's "neutral" position in a similar way as described above for the edgewise loads. This deformation also induces shear and peeling stresses in the trailing edge of the blade. The section will deform into a state of "lowest energy level", i.e. a situation wherein as much as possible of the stress in the blade is distributed to other sections of the blade. When part of the shell deforms in this manner, it is usually referred to as an "ineffective panel". The distribution of the stresses to other parts of the blade means that these parts are subjected to a higher load. This will result in a larger tip deflection of the blade. Furthermore, the deformations of the blade's surface compromise the aerodynamic efficiency of the blade, because the designed shape of the profile is no longer maintained.

The scope of the present invention is set out by the accompanying claim set. In the context of the claims, the terms "comprising" or "comprises" do not exclude other possible members or steps. Also, the mentioning of references, such as "a", "an", etc., should not be construed as excluding a plurality. Furthermore, individual features mentioned in different claims, may possibly be advantageously combined, and the mentioning of these features in different claims does not exclude that a combination of features is possible and advantageous.

The invention claimed is:

1. A wind turbine blade, comprising:
   a shell having a section with an aerodynamic profile, wherein the;
   at least one girder; and
   at least one elongated reinforcing member connected to the shell for increasing the strength of the blade, each of the at least one elongated reinforcing member being positioned between and spaced apart from a girder of the at least one girder closest to a trailing edge of the shell and the trailing edge of the shell, each of the at least one elongated reinforcing member having a first end and a second end and extending between the first end and the second end, wherein the first end is connected to an upper part of the shell itself and the second end is connected to a lower part of the shell itself thereby preventing deformation of the trailing edge of the shell.

2. A wind turbine blade according to claim 1, wherein the at least one elongated reinforcing member comprises a plurality of elongated reinforcing members positioned in a spaced relationship along a spanwise extension of the blade.

3. A wind turbine blade according to claim 1, wherein at least one of the at least one elongated reinforcing member extends in a direction that forms an angle with relation to a spanwise extension of the blade ranging from 70° to 110°.

4. A wind turbine blade according to claim 3, wherein at least one of the at least one elongated reinforcing member extends in a direction that is substantially perpendicular to the spanwise extension of the blade.

5. A wind turbine blade according to claim 1, wherein at least one of the at least one elongated reinforcing member extends substantially perpendicular to the profile chord of the blade.

6. A wind turbine blade according to claim 1, wherein one of the at least one elongated reinforcing member forms an angle with another one of the at least one elongated reinforcing member.

7. A wind turbine blade according to claim 6, wherein the angle ranges from 15° to 135°.

8. A wind turbine blade according to claim 1, wherein at least one of the at least one elongated reinforcing member extends substantially parallel to the girder.

9. A wind turbine blade according to claim 1, wherein at least one of the at least one elongated reinforcing member forms an angle with the girder ranging from 0° to 70°.

10. A wind turbine blade according to claim 1, wherein at least one of the at least one elongated reinforcing member forms an angle with the girder ranging from 10° to 20°.

11. A wind turbine blade according to claim 1 wherein at least one of the at least one elongated reinforcing member is a flexible wire with high tensional strength without a capability of resisting compression forces.

12. A wind turbine blade according to claim 1, wherein at least one of the at least one elongated reinforcing member is made of reinforced plastic, wood, compressed fibres, or plant fibres with high cellulose content.

13. A wind turbine blade according to claim 1, wherein the at least one elongated reinforcing member is spaced from the girder by substantially a same distance as the at least one elongated reinforcing member is spaced from the trailing edge.

14. A wind turbine blade according to claim 1, wherein at least one of the at least one elongated reinforcing member forms an angle with the girder ranging from 0° to 40°.

15. A wind turbine blade according to claim 1, further comprising a mechanical connection, between each of the first and second ends and the shell.

16. A wind turbine blade according to claim 15, wherein the first and second ends extend through the shell and the mechanical connection includes an element engaging with the first and second ends.

17. A wind turbine blade according to claim 15, wherein the mechanical connection includes an anchor secured to the shell.

18. A wind turbine blade according to claim 1, wherein the at least one elongated reinforcing member includes a first elongated reinforcing member in a first row along a spanwise extension of the blade and a second elongated reinforcing member in a second row, between the first row and the girder closest to the trailing edge of the shell.

19. A wind turbine blade according to claim 18, wherein the first and second elongated reinforcing members cross each other along the profile chord of the blade.

20. A wind turbine blade according to claim 18, wherein the first and second elongated reinforcing members tilt towards each other along the profile chord of the blade.

21. A wind turbine blade according to claim 1, wherein the shell is made of fibre reinforced plastic material.

22. A method of increasing the strength of a wind turbine blade having a shell with a section having an aerodynamic profile, the method comprising:

positioning at least one elongated reinforcing member inside the shell, each of the at least one elongated reinforcing member having a first end and a second end and extending between the first end and the second end;

positioning at least one girder inside the shell; and connecting the first end to an upper part of the shell itself and the second end to a lower part of the shell itself, the at least one elongated reinforcing member being positioned between and spaced apart from a girder of the at least one girder closest to a trailing edge of the shell and the trailing edge of the shell.

23. A wind turbine blade, comprising:

a shell having a section with an aerodynamic profile, wherein the;

at least one girder; and at least one elongated reinforcing member connected to the shell for increasing the strength of the blade, each of the at least one elongated reinforcing member being positioned between and spaced apart from a girder of the at least one girder closest to a trailing edge of the shell and the trailing edge of the shell, each of the at least one elongated reinforcing member having a first end and a second end and extending between the first end and the second end, wherein the first end is connected to an upper part of the shell and the second end is connected to a lower part of the shell thereby preventing deformation of the trailing edge of the shell, wherein at least one of the at least one elongated reinforcing member forms an angle with the girder ranging from 0° to 40°.

\* \* \* \* \*